(12) United States Patent
Hu et al.

(10) Patent No.: US 8,880,004 B2
(45) Date of Patent: Nov. 4, 2014

(54) SYSTEM AND METHOD FOR RESOLVING CONFLICTS BETWEEN AIR INTERFACES IN A WIRELESS COMMUNICATION SYSTEM

(75) Inventors: Jun Hu, San Diego, CA (US); Reza Shahidi, San Diego, CA (US); Gregory R. Lie, San Diego, CA (US); Ravindra M. Garach, San Diego, CA (US); Shian-De Ju, San Diego, CA (US); Yu-Chuan Lin, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 12/775,323

(22) Filed: May 6, 2010

(65) Prior Publication Data

US 2010/0291882 A1    Nov. 18, 2010

Related U.S. Application Data

(60) Provisional application No. 61/178,332, filed on May 14, 2009, provisional application No. 61/178,452, filed on May 14, 2009, provisional application No. 61/178,338, filed on May 14, 2009.

(51) Int. Cl.
*H04B 1/38*    (2006.01)

(52) U.S. Cl.
USPC .......... 455/73; 455/450; 455/550.1; 370/329; 370/341; 375/316

(58) Field of Classification Search
USPC ................ 455/73, 450, 550.1, 552.1, 557; 370/329, 341, 348; 375/316
See application file for complete search history.

(56) References Cited

U.S. PATENT DOCUMENTS

| | | | |
|---|---|---|---|
| 5,465,410 | A | 11/1995 | Hiben et al. |
| 5,590,156 | A | 12/1996 | Carney |
| 6,282,184 | B1 | 8/2001 | Lehman et al. |
| 6,333,926 | B1 | 12/2001 | Van Heeswyk et al. |
| 6,415,146 | B1 | 7/2002 | Capece |

(Continued)

FOREIGN PATENT DOCUMENTS

| | | |
|---|---|---|
| CN | 1759542 A | 4/2006 |
| CN | 1791276 A | 6/2006 |

(Continued)

OTHER PUBLICATIONS

International Search Report and Written Opinion—PCT/US2010/034010, International Search Authority—European Patent Office—Oct. 13, 2010.

(Continued)

*Primary Examiner* — Tuan H Nguyen
(74) *Attorney, Agent, or Firm* — Eric Ho

(57) ABSTRACT

A device and method for resolving conflicts between air interfaces in a wireless communication system are disclosed. In one embodiment, the method comprises communicating over a first air interface, receiving a request for resources for concurrent use in communicating over a second air interface, determining that a conflict does not exist between resources for the first air interface and at least a portion of the requested resources for the second air interface, and concurrently communicating over the first air interface using resources for the first air interface and communicating over the second air interface using at least a portion of the requested resources for the second air interface.

23 Claims, 8 Drawing Sheets

(56) References Cited

U.S. PATENT DOCUMENTS

| | | |
|---|---|---|
| 6,999,759 B2 | 2/2006 | Harris et al. |
| 7,187,923 B2 | 3/2007 | Mousseau et al. |
| 7,426,648 B2 * | 9/2008 | Lint et al. ............ 713/320 |
| 7,885,658 B2 | 2/2011 | Jiang et al. |
| 7,966,037 B2 * | 6/2011 | Rayzman et al. ........ 455/552.1 |
| 2002/0061031 A1 | 5/2002 | Sugar et al. |
| 2002/0080728 A1 | 6/2002 | Sugar et al. |
| 2002/0131396 A1 | 9/2002 | Knuutila et al. |
| 2003/0054788 A1 | 3/2003 | Sugar et al. |
| 2003/0152044 A1 | 8/2003 | Turner |
| 2004/0041538 A1 | 3/2004 | Sklovsky |
| 2004/0095903 A1 | 5/2004 | Ryan et al. |
| 2004/0203830 A1 | 10/2004 | Rudowicz et al. |
| 2005/0003848 A1 | 1/2005 | Chen et al. |
| 2006/0189346 A1 | 8/2006 | Turner et al. |
| 2006/0281486 A1 | 12/2006 | Ngai et al. |
| 2007/0041351 A1 | 2/2007 | Hazra et al. |
| 2007/0110197 A1 | 5/2007 | Bagchi et al. |
| 2007/0159399 A1 | 7/2007 | Perunka et al. |
| 2007/0232349 A1 | 10/2007 | Jones et al. |
| 2008/0004063 A1 | 1/2008 | Haapoja et al. |
| 2008/0058000 A1 | 3/2008 | Tanaka et al. |
| 2008/0117859 A1 | 5/2008 | Shahidi et al. |
| 2008/0151798 A1 | 6/2008 | Camp |
| 2008/0253351 A1 | 10/2008 | Pernu et al. |
| 2008/0259833 A1 | 10/2008 | Ozturk et al. |
| 2008/0261540 A1 | 10/2008 | Rohani et al. |
| 2008/0285536 A1 | 11/2008 | Kaidar et al. |
| 2008/0287158 A1 | 11/2008 | Rayzman et al. |
| 2008/0311912 A1 | 12/2008 | Balasubramanian et al. |
| 2009/0093216 A1 | 4/2009 | Sun et al. |
| 2009/0103455 A1 | 4/2009 | Balasubramanian et al. |
| 2010/0130252 A1 | 5/2010 | Chishima et al. |
| 2010/0136975 A1 | 6/2010 | Onishi |
| 2010/0291884 A1 | 11/2010 | Hu et al. |
| 2010/0291966 A1 | 11/2010 | Hu et al. |
| 2011/0122972 A1 | 5/2011 | Lie et al. |

FOREIGN PATENT DOCUMENTS

| | | |
|---|---|---|
| CN | 1881821 A | 12/2006 |
| CN | 1980421 A | 6/2007 |
| EP | 1727291 | 11/2006 |
| FR | 2920063 | 2/2009 |
| JP | 2005012815 A | 1/2005 |
| JP | 2007274537 A | 10/2007 |
| JP | 2008061014 A | 3/2008 |
| JP | 2008136137 A | 6/2008 |
| JP | 2008172450 A | 7/2008 |
| JP | 2008244989 A | 10/2008 |
| JP | 2008252395 A | 10/2008 |
| JP | 2008545295 A | 12/2008 |
| JP | 2009005195 A | 1/2009 |
| JP | 2009060250 A | 3/2009 |
| JP | 2009065307 A | 3/2009 |
| JP | 2009532965 A | 9/2009 |
| WO | WO0051376 | 8/2000 |
| WO | WO03009557 | 1/2003 |
| WO | WO2006038085 | 4/2006 |
| WO | 2007113319 A1 | 10/2007 |

OTHER PUBLICATIONS

International Search Report and Written Opinion—PCT/US2010/034018, International Search Authority—European Patent Office—Aug. 17, 2010.

International Search Report and Written Opinion—PCT/US2010/034024, International Search Authority—European Patent Office—Aug. 2, 2010.

International Search Report and Written Opinion—PCT/US2010/034951, International Search Authority—European Patent Office—Oct. 25, 2010.

Taiwan Search Report—TW099115553—TIPO—Apr. 16, 2013.

* cited by examiner

US 8,880,004 B2

SYSTEM AND METHOD FOR RESOLVING CONFLICTS BETWEEN AIR INTERFACES IN A WIRELESS COMMUNICATION SYSTEM

CROSS-REFERENCE TO RELATED APPLICATIONS

This application claims priority under §119(e) to the following U.S. Provisional Applications: (1) U.S. Prov. App. No. 61/178,332, entitled "System and method for resolving conflicts between air interfaces in a wireless communication system," filed May 14, 2009; (2) U.S. Prov. App. No. 61/178,452, entitled "Allocating transmit power among multiple air interfaces," filed May 14, 2009; and (3) U.S. Prov. Appl. No. 61/178,338, entitled "System and method for dropping and adding an air interface in a wireless communication system," filed May 14, 2009. The above-referenced applications are herein incorporated by reference in their entirety.

BACKGROUND

1. Field

This disclosure relates to wireless communication.

2. Description of the Related Technology

Wireless communication systems exist which are capable of communicating over multiple air interfaces, but are not capable of concurrently communicating over multiple air interfaces using shared resources. Thus, a need exists for wireless communication systems able to concurrently communicate over multiple air interfaces.

SUMMARY OF THE INVENTION

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the features of this invention provide advantages that include concurrent communication over multiple air interfaces.

One aspect of the disclosure is a method of resolving conflicts between two air interfaces, the method comprising communicating over a first air interface, receiving a request for resources for concurrent use in communicating over a second air interface, determining that a conflict does not exist between resources for the first air interface and at least a portion of the requested resources for the second air interface, and concurrently communicating over the first air interface using the resources for the first air interface and communicating over the second air interface using at least a portion of the requested resources for the second air interface.

Another aspect of the disclosure is a method of resolving conflicts between two air interfaces, the method comprising communicating at a first frequency, receiving data indicative of one or more second frequencies, determining which of the one or more second frequencies is within a predetermined bandwidth of the first frequency, and concurrently communicating at the first frequency and at least a portion of the determined second frequencies.

Another aspect of the disclosure is a device for resolving conflicts between two air interfaces, the device comprising, a transceiver configured to communicate over a first air interface, and a processor configured to receive a request for resources for concurrent use in communicating over a second air interface and determine that a conflict does not exist between resources for the first air interface and at least a portion of the requested resources for the second air interface, wherein the transceiver is further configured to concurrently communicate over the first air interface using the resources for the first air interface and communicate over the second air interface using at least a portion of the requested resources for the second air interface.

Another aspect of the disclosure is a device for resolving conflicts between two air interfaces, the device comprising means for communicating over a first air interface, means for receiving a request for resources for concurrent use in communicating over a second air interface, means for determining that a conflict does not exist between resources for the first air interface and at least a portion of the requested resources for the second air interface, and means for concurrently communicating over the first air interface using the resources for the first air interface and communicating over the second air interface using at least a portion of the requested resources for the second air interface.

Yet another aspect of the disclosure is a computer chip encoded with instructions for executing a method of resolving conflicts between two air interfaces, the method comprising communicating over a first air interface, receiving a request for resources for concurrent use in communicating over a second air interface, determining that a conflict does not exist between resources for the first air interface and at least a portion of the requested resources for the second air interface, and concurrently communicating over the first air interface using the resources for the first air interface and communicating over the second air interface using at least a portion of the requested resources for the second air interface.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a multiple access technique. SC-FDMA systems generally have similar performance and essentially the same overall complexity as OFDMA systems. An SC-FDMA signal generally has a lower peak-to-average power ratio (PAPR) than that of an OFDMA signal because of its inherent single carrier structure. SC-FDMA has drawn great attention, especially in uplink communications, where lower PAPR greatly benefits the mobile terminal in terms of transmit power efficiency. It is proposed as an uplink multiple access scheme in 3GPP Long Term Evolution (LTE), or Evolved UTRA.

Figure 1:
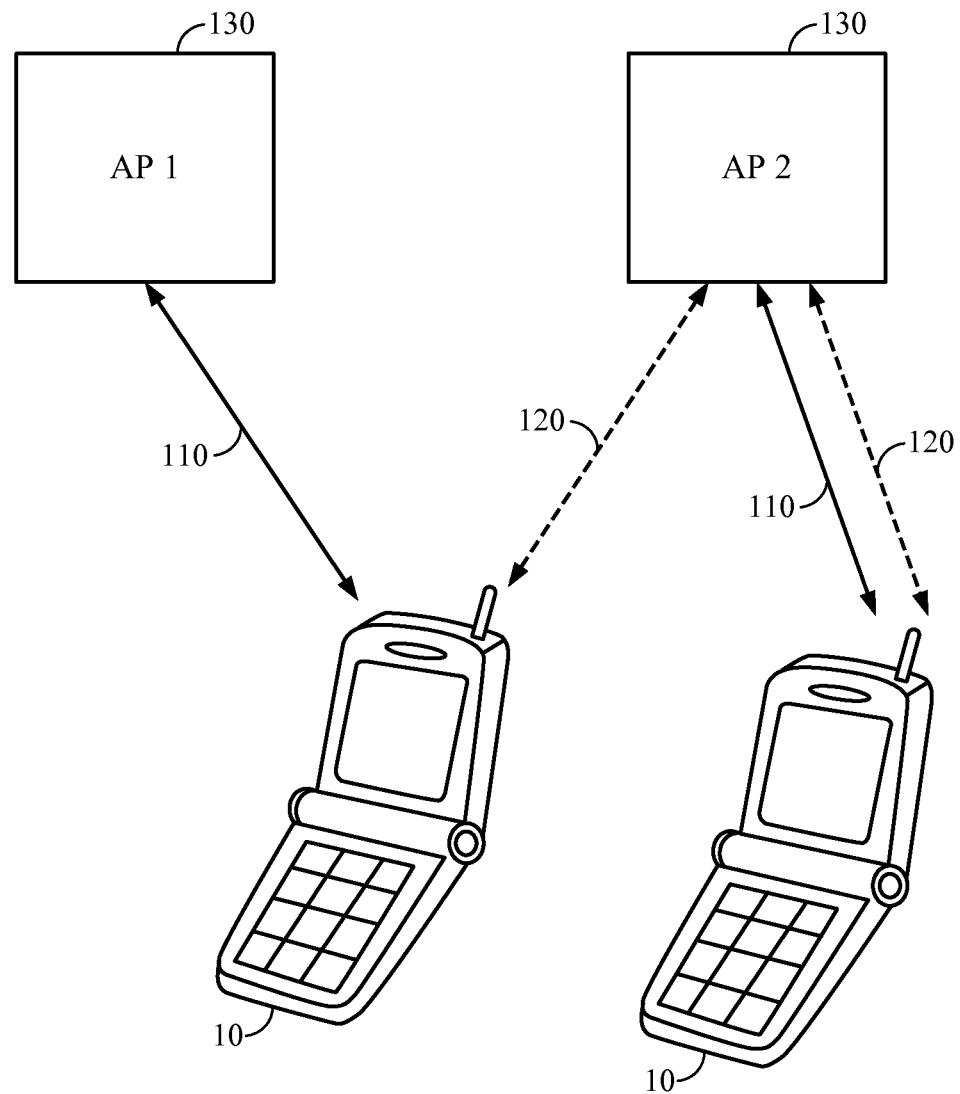
FIG. 1 is a diagram illustrating wireless communication devices engaged in simultaneous communication over two air interfaces.

FIG. 1 is a diagram illustrating wireless communication devices engaged in simultaneous communication over two air interfaces. Each wireless communication device 10 can simultaneously establish a first air interface 110 and a second air interface 120 between itself and one or more access points 130. In one embodiment, the first air interface 110 is established at a first channel defined by a first frequency or frequency band, whereas the second air interface 120 is established at a second channel defined by a second frequency or frequency band which is different from the first frequency or frequency band.

In one embodiment, the first air interface 110 supports 1×RTT traffic and the second air interface 120 supports EVDO traffic. 1×RTT, also known as 1×, 1×RTT, and IS-2000, is an abbreviation of 1 times Radio Transmission Technology. EVDO, abbreviated as EV or DO, is an abbreviation of Evolution-Data Only. Both 1×RTT and EVDO are telecommunications standards for the wireless transmission of data through radio signals maintained by 3GPP2 ($3^{rd}$ Generation Partnership Project), which are considered types of CDMA2000 (Code Division Multiple Access 2000).

In other embodiments, the first air interface 110 or the second air interface 120 can support 1×Advanced, DO (Release 0, Revision A or B), UMTS (HSPA+), GSM, GPRS, and EDGE technologies.

Figure 2A:
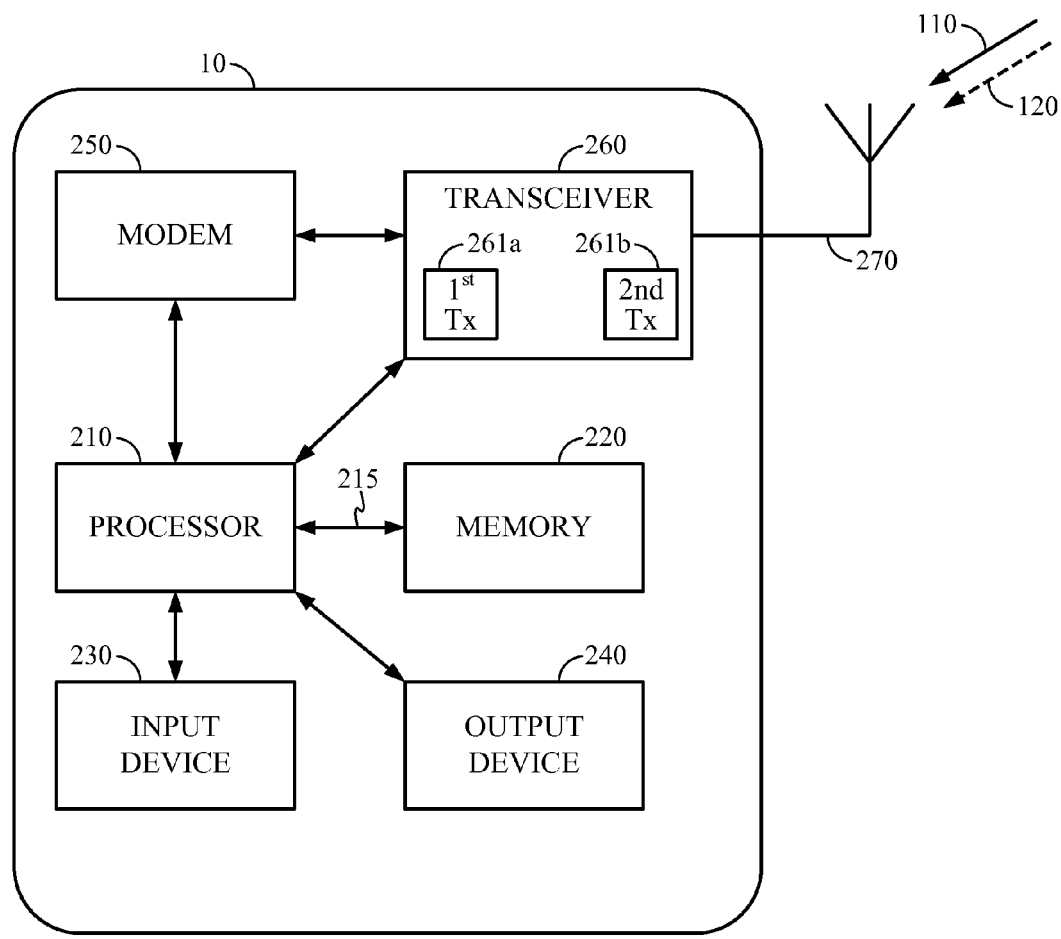
FIG. 2A is a functional block diagram of a wireless communication device.

FIG. 2A is a functional block diagram of a wireless communication device. The wireless communication device 10 includes a processor 210 in data communication with a memory 220, an input device 230, and an output device 240. The processor is further in data communication with a modem 250 and a transceiver 260. The transceiver 260 is also in data communication with the modem 250 and an antenna 270. Although described separately, it is to be appreciated that functional blocks described with respect to the wireless communication device 10 need not be separate structural elements. For example, the processor 210 and memory 220 may be embodied in a single chip. Similarly, two or more of the processor 210, modem 250, and transceiver 260 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses 215, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 is also coupled to an input device 230 and an output device 240 for, respectively, receiving input from and providing output to, a user of the wireless communication device 10. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 210 is further coupled to a modem 250 and a transceiver 260. The modem 250 and transceiver 260 prepare data generated by the processor 210 for wireless transmission via the antenna 270 according to one or more air interface standards. For example, the antenna 270 may facilitate transmission over a first air interface 110 and a second air interface 120. The modem 250 and transceiver 260 also demodulate data received via the antenna 270 according to one or more air interface standards. The transceiver can include a transmitter, receiver, or both. In other embodiments, the transmitter and receiver are two separate components. The transceiver 260 can include a first transceiver 261a and a second transceiver 261b. The modem 250 and transceiver 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 2B:
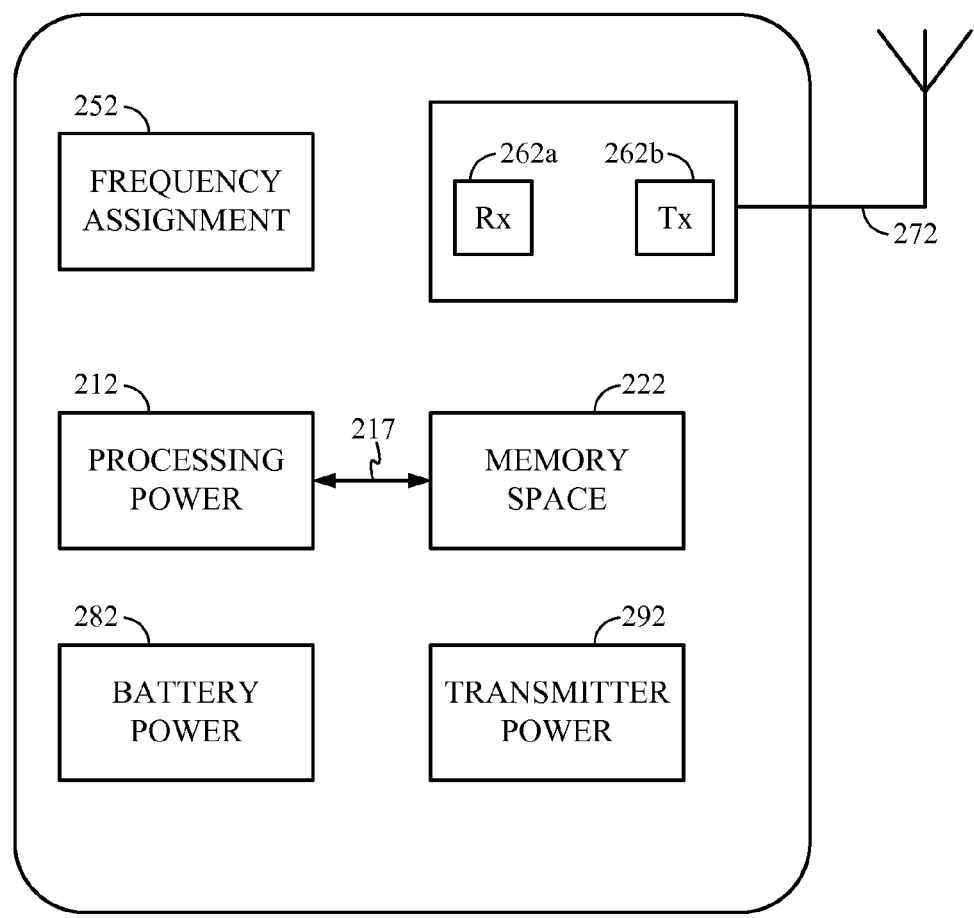
FIG. 2B is a representative block diagram of resources within a wireless communication device.

FIG. 2B is a representative block diagram of resources within a wireless communication device. As described above, resources for communication can be requested by a wireless communication device or a module thereof. The requested resources can include resources from at least one of the following categories: hardware resources, radio frequency (RF) resources, and power resources. Hardware resources include, for example, memory space 222 of a memory, processing power 212 of a processor, or bandwidth of one or more buses 217. RF resources include, for example, receiver chain component 262a, a transmitter chain component 262b, an antenna 272, or a frequency assignment 252. Power resources include, for example, battery power 282 or available transmit power 292.

Figure 3:
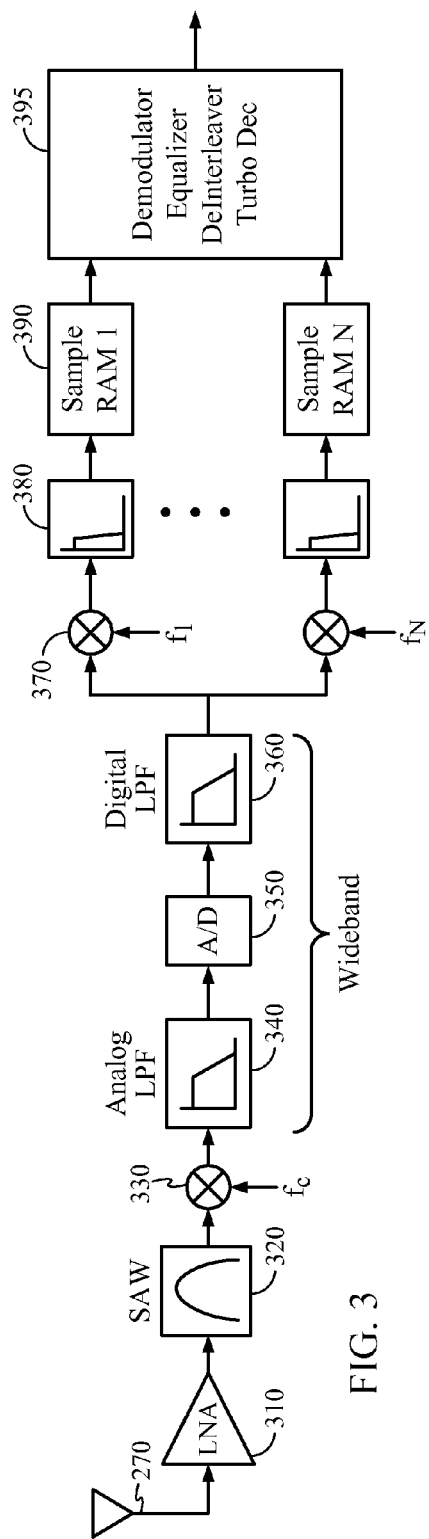
FIG. 3 is a functional block diagram of a receiver of a wireless communication device.

FIG. 3 is a functional block diagram of a receiver of a wireless communication device. FIG. 3 illustrates exemplary components which may be embodied in the transceiver 270 of FIG. 2. A signal received on the antenna 270 is amplified by a low-noise amplifier 310. Depending on the particular embodiment, the amplified signal is then pass through a SAW (surface acoustic wave) filter 320. A SAW filter is an electromechanical device in which electrical signals are converted into a mechanical wave in a device constructed of a piezoelectric crystal or ceramic. The mechanical wave is delayed as it propagates across the device before being converted back into an electric signal by electrodes. The delayed outputs are recombined to produce a direct analog implementation of a finite impulse response filter. The signal is then multiplied by a center frequency at a multiplier 330. The base-banded signal is then passed through an analog low-pass filter 340, converted to a digital signal at an analog-to-digital converter 350, and filtered once again with a digital low-pass filter 360.

The signal is then split into multiple paths. Each path is multiplied by a different frequency at a multiplier 370 and passed through an appropriate filter 380 before being sampled with a sampler 390. Further processing, including demodulation, equalization, deinterleaving, and error correction coding, can be performed in a processing module 395 or the modem 250 or processor 210 of FIG. 2.

Figure 4:
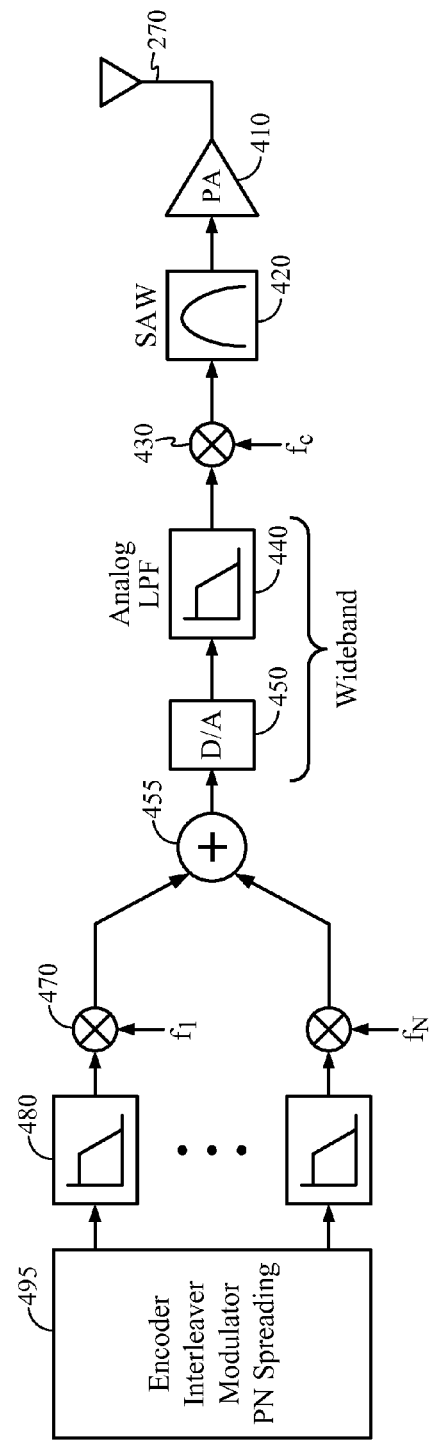
FIG. 4 is a functional block diagram of a transmitter of a wireless communication device.

FIG. 4 is a functional block diagram of a transmitter of a wireless communication device. FIG. 4 illustrates additional exemplary components which may be embodied in the transceiver 260 of FIG. 2. The function of the transmitter is similar to that of the receiver, but in reverse. In particular, data generated by the processor 210 of FIG. 2 may be subject to preliminary processing in a processing module 495, the modem 250 or the processor 210 itself. The data for each channel is passed through an appropriate filter 480 before being modulated at a multiplier 470. The modulated carriers are added together at an adder 455 before being converted into an analog signal at a digital-to-analog converter 450. The analog signal is passed through an analog low-pass filter 440 before being modulated to a center frequency at a multiplier 430. The modulated signal is optionally passed through a SAW filter 420 and a power amplifier 410 before being transmitter via the antenna 270.

As described above with respect to FIG. 1, a wireless device 10 is capable of establishing a first air interface 110 and a second air interface 120. Such a wireless device is able to support simultaneous voice and data services in which two different technologies (such as 1× and DO) are used at the same wireless device at the same time. Ideally, two air interface technologies would work independently and without conflict. However, in practical systems, the wireless device can be limited in capability to a certain extent. Thus, in many cases, the wireless device's limitations can require arbitration between two technologies in order to resolve conflicts.

Figure 5:
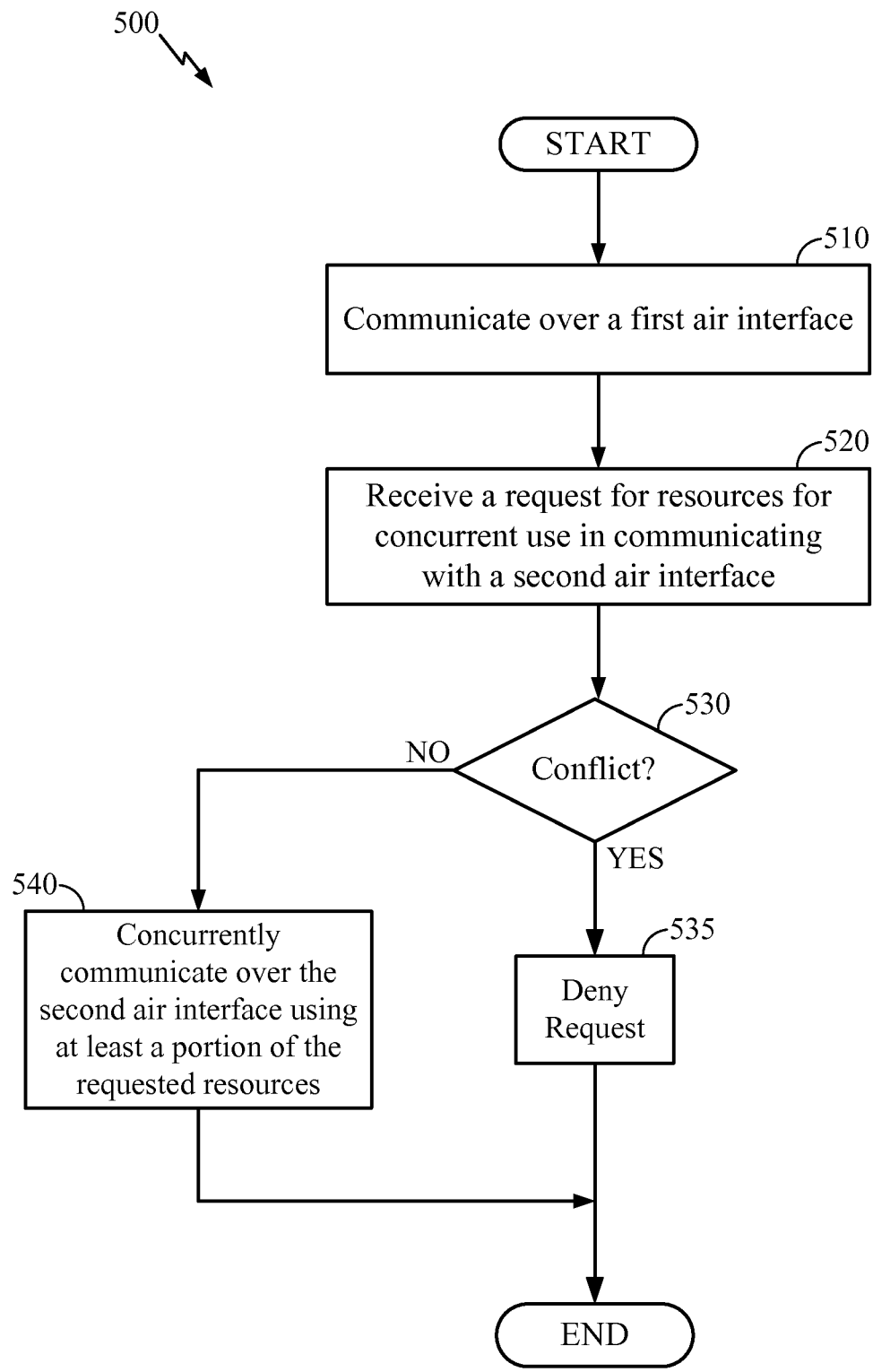
FIG. 5 is a flowchart illustrating a method of resolving a conflict between two air interfaces.

Three goals in resolving conflicts include: (1) a first air interface should be given a higher priority than a second air interface, (2) connections should not be dropped unnecessarily, and (3) the algorithm should be simple. It is to be appreciated that each of these goals need not be achieved by each embodiment, and that some embodiments may fail to achieve any of the goals. FIG. 5 is a flowchart illustrating a method of resolving conflicts between two air interfaces.

The process 500 begins, in block 510, with communication over a first air interface. The first air interface can be an 1×RTT interface, an 1×Advanced interface, a 1Xtreme interface, an EVDO interface, an EV-DV interface, a CDMA200 interface, a DO (Release 0, Revision A or B) interface, an UMTS (HSPA+) interface, a GSM interface, a GPRS interface, an EDGE interface, or any other interface known to those skilled in the art. Although the term "air interface at a frequency" may describe a discrete frequency, those skilled in the art will appreciate that the term also encompasses an air interface established over a specified band of frequencies or a frequency-defined data channel. Although not shown in FIG. 5, the process 500 could optionally include communication over a second air interface concurrent with communication over the first air interface. The communication over the first air interface (and, optionally, the second air interface) can be performed by the wireless device 10 of FIG. 1. Alternatively, the communication over the first air interface can be performed by at least one of the processor 210, modem 250, transceiver 260, or antenna 270 of FIG. 2.

The process 500 continues to block 520 where a request for resources for concurrent use in communicating over a second air interface is received. The request can originate from outside, and be received by, the wireless device 10 of FIG. 2 via the antenna 270 or the input device 230. The request for resources need not be explicit, but may request that a function be performed that requires the resources. Alternatively, the request can be generated within the wireless device 10 and received by the processor 210. The request for resources can include a traffic channel assignment (TCA) requesting that a second air interface be established at a second frequency, a traffic channel assignment requesting that a second air interface established at a second frequency re-establish at a different second frequency, instructions to hand-off a first or second air interface to a new frequency, instructions to perform a frequency search, call-redirection instructions, or a request to receive or transmit data traffic over the first or second air interface.

Next, in decision block 530, it is determined if there is a conflict in providing the requested resources. This determination can be performed by the processor 210 of FIG. 2. Such conflicts can arise when the first air interface and second air interface both request the same resources. For example, if the wireless device is communicating over a first air interface at a first frequency, the modem and other hardware may limit the available frequencies. In order to communicate over a second air interface at a second frequency which is not one of the available frequencies, the communication over the first air interface at the first frequency would be disrupted. Similarly, if the wireless device is communicating over a first air interface with a first transmit power, regulations or hardware may limit the total power for transmission. In order to communicate over a second air interface at a second power, when the sum of the first power and second power is greater than the maximum allowed power, communication over the first air interface would be disrupted.

If there is a conflict, the process moves to block 535 and the request for resources is denied. In other embodiments, no action is taken in block 535 and the request for resources goes unanswered. In another embodiment, other action(s) is taken in block 535, such as closing an existing second air interface. If is it determined that there is no conflict, the process 500 continues to block 540 where communication over the second air interface using the requested resources occurs concurrently with communication over the first air interface. As described above, the communication over the second air interface can be performed by the wireless device 10 of FIG.

1. Alternatively, the communication over the second air interface can be performed by at least one of the processor 210, modem 250, transceiver 260, or antenna 270 of FIG. 2. In another embodiment, the wireless device has at least one of a second modem, transceiver, or antenna specifically for use for the second air interface.

As mentioned above, conflicts can arise based on the bandwidth available to the system. In certain wireless devices, transmission is limited to a bandwidth about a center frequency. These limitations may arise from hardware limitations or due to governmental regulations. The absolute bandwidth of transmission is predetermined by the center frequency. For example, if a first air interface is established at a center frequency of 450 MHz, the wireless device may only be capable of transmitting signals between 445 MHz and 455 MHz, whereas if the first air interface is established at 700 MHz, the wireless device may only be capable of transmitting signals between 695 MHz and 705 MHz. In both cases, the maximum supported bandwidth in 10 MHz.

Although the bandwidth is centered at the center frequency of the first air interface above, this is not necessarily the case. For example, if the maximum supported bandwidth is 10 MHz, in another embodiment, the first air interface may be established at 800 MHz and the wireless device may only be capable of transmitting signals between 798 MHz and 808 MHz.

Described below are potential solutions for a variety of different conflicts arising from two air interface technologies. Although 1× and DO will be used as an example, it will be understood by those skilled in the art that the ideas are generally application to other technologies as well.

In DO Rev.B, an access terminal can operate in both a single carrier mode and a multi-carrier mode; however, due to constraints on the maximum supported bandwidth, which is dependent on the modem and RF card, not all the DO Rev.B carriers can be supported concurrently with 1× at a specific frequency.

A conflict may arise when a first air interface is established at a first frequency and the wireless device attempts to establish a second air interface. The wireless device receives a traffic channel assignment (TCA) from the access network which assigns a second frequency to the access terminal for the second air interface. If the second frequency is within the maximum supported bandwidth about the first frequency, the connection can be established normally. If the second frequency is outside of the maximum supported bandwidth, the connection cannot be established without disrupting the first air interface. In this case, the wireless device discards (or ignores) the TCA. The wireless device may need to temporarily connect to the access network over the second frequency in order to close the connection by sending a ConnectionClose command.

A conflict can also arise when a first air interface is established at a first frequency, a second air interface is established at a second frequency within the maximum supported bandwidth of the first frequency, and the wireless device receives a new traffic channel assignment from the access network which assigns a new second frequency for the second air interface. If the new second frequency is still within the maximum supported bandwidth about the first frequency, the wireless device accepts the new assignment and proceeds normally. If the new second frequency is outside of the maximum supported bandwidth about the first frequency, the channel assignment is discarded and the wireless terminal closes the connection with the access network via the original second frequency. In one embodiment, a ConnectionClose command with CloseReason='010' (Connection Error) is transmitted.

As mentioned above, in DO Rev.B, an access terminal can operate in both a single carrier mode and a multi-carrier mode. Although the above conflicts arise in single carrier mode, the same or different conflicts may arise in multi-carrier mode. One potential source of conflict is when a first air interface is already established at a first frequency and the wireless device attempts to establish a second air interface. The wireless device receives a traffic channel assignment (TCA) from the access network which assigns a set of second frequencies to the access terminal for the second air interface. If none of the set of second frequencies are within the maximum supported bandwidth of the first frequency, the wireless device discards the TCA. The wireless device may need to temporarily connect to the access network over one of the second frequencies in order to close the connection by sending a ConnectionClose command.

If at least one of second frequencies is within the maximum supported bandwidth of the first frequency, the wireless device can establish a second air interface over one or more those second frequencies. In one embodiment, only one of the second frequencies within the maximum supported bandwidth of the first frequency is selected by the wireless device for establishing the second air interface. Preference is first given to any carrier that is in traffic, then given to a control channel carrier, then a reportable carrier, then the carrier with the highest reverse channel dropping rank. Ties can be broken randomly.

Another source of conflict is when a first air interface is established at a first frequency, a second air interface is established at a second frequency within the maximum supported bandwidth of the first frequency, and the wireless device receives a new traffic channel assignment from the access network which assigns multiple new second frequencies for the second air interface. If none of the set of second frequencies are within the maximum supported bandwidth of the first frequency, the wireless device discards the TCA and closes the established connection. The wireless device may transmit a ConnectionClose command with CloseReason='010' (Connection Error). If the previously established second frequency is included in the multiple new second frequencies, the wireless device maintains that second frequency. The wireless device can transmit a ReverseCDMAChannelDropped message with ReasonCode='0×0' (Headroom Limitation) for the other new second frequencies.

If the previously established second frequency is not included in the multiple new second frequencies, but at least one of other new second frequencies is within the maximum supported bandwidth of the first frequency, the wireless device can establish a second air interface over one or more those second frequencies. In one embodiment, only one of the second frequencies within the maximum supported bandwidth of the first frequency is selected by the wireless device for establishing the second air interface. Preference is first given to any carrier that is in traffic, then given to a control channel carrier, then a reportable carrier, then the carrier with the highest reverse channel dropping rank. Ties can be broken randomly.

Conflicts can also arise when a second air interface is established at multiple second frequencies and the wireless device attempts to establish a preferred air interface at a first frequency. If none of the multiple second frequencies are within the maximum supported bandwidth of the first frequency, the wireless device should close the second air interface. The wireless device can transmit a ConnectionClose command with CloseReason='010' (Connection Error). If at least one of the multiple second frequencies is within the maximum supported bandwidth of the first frequency, the wireless device should maintain at least one of those second frequencies. In one embodiment, only one of the multiple second frequencies is selected to be maintained. Preference is first given to any carrier that is in traffic, then given to a control channel carrier, then a reportable carrier, then the carrier with the highest reverse channel dropping rank. Ties can be broken randomly.

As described above, conflict can arise from traffic channel assignments. Conflicts can also arise from hard handoffs, candidate frequency searches (CFSs), and off frequency searches (OFSs). In certain cases, one of the air interfaces may fall out of the maximum supported bandwidth.

Conflicts can arise when a first air interface is established at a first frequency, a second air interface is established at a second frequency within the maximum supported bandwidth of the first frequency, and an inter-frequency hard handoff is triggered for the first air interface specifying a new first frequency. If the second frequency is within the maximum supported bandwidth of the new first frequency, the wireless device maintains the second air interface at the second frequency and performs the hard handoff. If the second frequency is outside of the maximum supported bandwidth of the new first frequency, the wireless device closes the second air interface and performs the hard handoff. The wireless device can log a ConnectionFailureReason='0x1' (Connection failure due to tune away). After closing the second air interface, the wireless device may behave the same as Hybrid Mode Alternative operation (HMA) for the second air interface. The wireless device may re-establish the second air interface at a new second frequency within the maximum supported bandwidth of the first frequency.

Conflicts can also arise when a first air interface is established at a first frequency, a second air interface is established at a second frequency within the maximum supported bandwidth of the first frequency, and an inter-frequency hard handoff is triggered for the second air interface specifying a new second frequency. If the new second frequency is within the maximum supported bandwidth of the first frequency, the wireless device maintains the first air interface at the first frequency and performs the hard handoff. If the new second frequency is outside the maximum supported bandwidth of the first frequency, the wireless device closes the second air interface. The wireless device can submit a ConnectionClode message with CloseReason='010' (Connection Error).

When a first air interface is established at a first frequency and a second air interface is established at a second frequency, the wireless device may initiate a candidate frequency search for the first air interface. In either case, the second air interface is maintained. There may be some interruption in the traffic of the second air interface due to tuning away to candidate frequencies outside the maximum supported bandwidth.

Similarly, when a first air interface is established at a first frequency and a second air interface is established at a second frequency, the wireless device may initiate one or more off frequency searches for the second air interface for new second frequencies. If an off frequency search indicates a new second frequency within the maximum supported bandwidth of the first frequency, the search is performed. If an off frequency search indicates a new second frequency outside the maximum supported bandwidth of the first frequency, the search is not performed. In some embodiments, the first air interface is maintained per HMA operation in either case.

Call-redirection can also be the source of conflicts. When a wireless device receives a service redirection message (SRDM) for a first interface over F-CSCH or F-DSCH or GSRDM/EGSRDM over F-DSCH, the wireless device may act on the message as specified in IS-2000. Once the wireless device acts on the message, it enters a system acquisition state on the target system.

If the channel separation between a first frequency associated with the first air interface and a second frequency associated with a second air interface is greater than the maximum supported bandwidth, the wireless device can operate in a legacy hybrid mode and simultaneous establishment of the two interfaces is not available. If the channel separation is less than the maximum supported bandwidth, the wireless device can establish the two interfaces simultaneously.

A redirection message can be received by the wireless device from a base station describe one or more frequencies for use by the wireless device. When the wireless device receives a "redirect" message over the second interface, if all the listed channels fall outside the maximum supported bandwidth of the first interface, the wireless device will close the second air interface and not attempt to redirect. If at least one channel of the redirect message falls within the maximum supported bandwidth of the first frequency, the wireless device will re-establish the second air interface on that channel.

Figure 6:
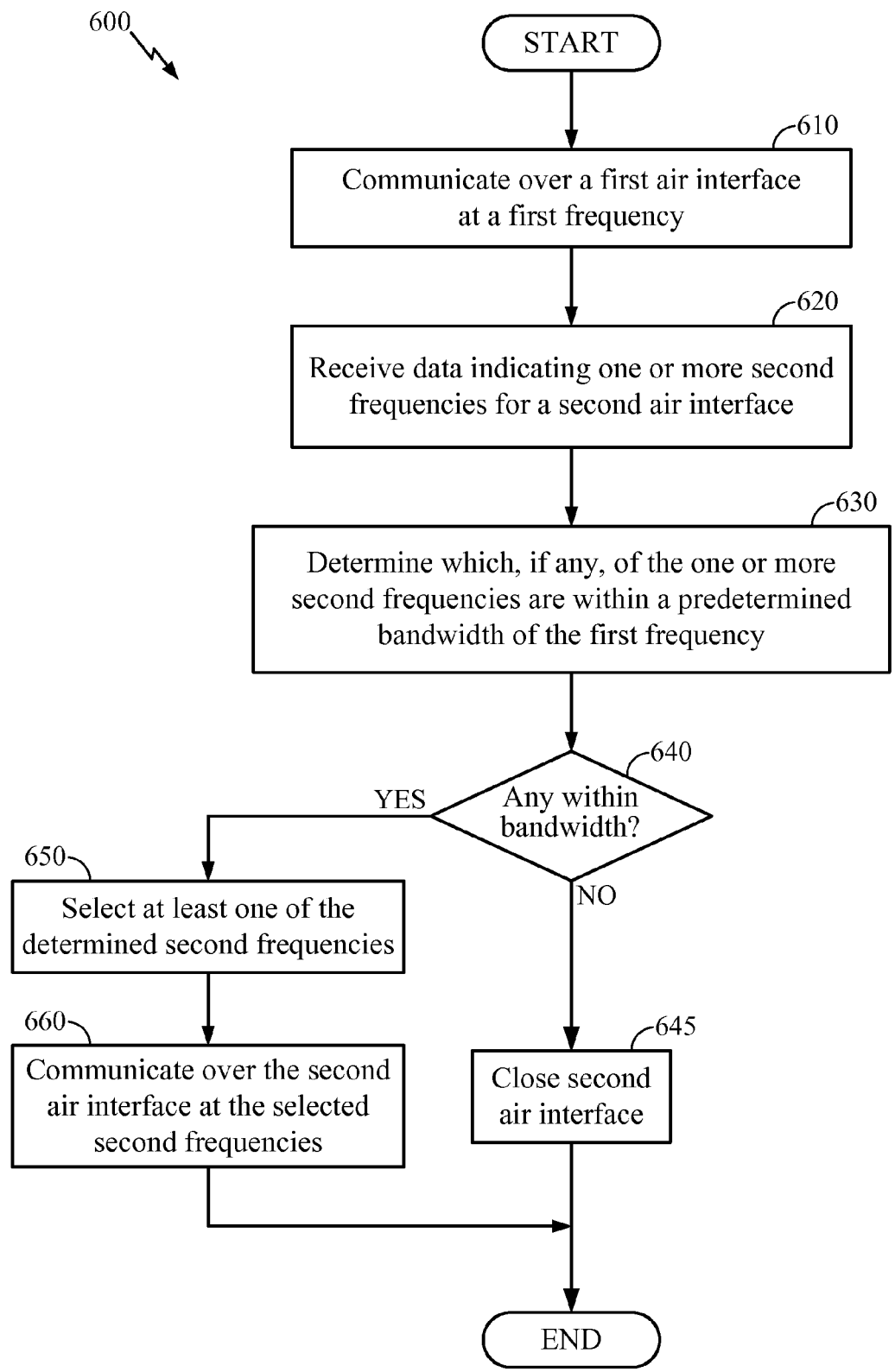
FIG. 6 is a flowchart illustrating a method of communicating over a first and second air interface.

Many of the above bandwidth-based conflict resolution methods described above fall under a generalized conflict resolution scheme. FIG. 6 is a flowchart illustrating a method of communicating over a first and second air interface. The process 600 begins, in block 610, with communication over a first air interface at a first frequency. As described with respect to block 510 of FIG. 5, the first air interface can be an 1×RTT interface, an 1×Advanced interface, a 1Xtreme interface, an EVDO interface, an EV-DV interface, a CDMA200 interface, a DO (Release 0, Revision A or B) interface, an UMTS (HSPA+) interface, a GSM interface, a GPRS interface, an EDGE interface, or any other interface known to those skilled in the art. Although the term "air interface at a frequency" may describe a discrete frequency, those skilled in the art will appreciate that the term also encompasses an air interface established over a specified band of frequencies or a frequency-defined data channel. Although not shown in FIG. 6, the process 600 could optionally include communication over a second air interface concurrent with the communication over a first air interface. The communication over the first air interface (and, optionally, the second air interface) can be performed by the wireless device 10 of FIG. 1. Alternatively, the communication over the first air interface can be performed by at least one of the processor 210, modem 250, transceiver 260, or antenna 270 of FIG. 2.

The process 600 continues to block 620 with the reception of data indicating one or more second frequencies for a second air interface. The data can originate from outside, and be received by, the wireless device 10 of FIG. 2 via the antenna 270. The data can include a traffic channel assignment (TCA) requesting that a second air interface be established at a second frequency, a traffic channel assignment requesting that a second air interface already established at a second frequency re-establish at a different second frequency, instructions to hand-off an established second air interface to a new frequency, instructions to perform a frequency search, or call-redirection instructions. In one embodiment, only one second frequency is indicated. However, in other embodiments more than one second frequency is indicated. For example, a TCA may be multi-carrier and specify a number of second frequencies for the second air interface.

Next, in block 630, it is determined which, if any, of the one or more second frequencies are within a predetermined bandwidth of the first frequency. The determination can be made by the processor 210 of FIG. 2. As described above, the bandwidth may be predetermined based on the hardware and the first frequency. In other embodiments, the bandwidth may be predetermined based on governmental regulations. Once the set (which may be empty) of second frequencies with the bandwidth is determined, the process 600 moves to decision block 640.

For example, in certain wireless devices, transmission is limited to a bandwidth about a center frequency. The absolute bandwidth of transmission is predetermined by the center frequency. For example, if a first air interface is established at a center frequency of 450 MHz, the wireless device may only be capable of transmitting signals between 445 MHz and 455 MHz, whereas if the first air interface is established at 700 MHz, the wireless device may only be capable of transmitting signals between 695 MHz and 705 MHz. In both cases, the maximum supported bandwidth in 10 MHz. Thus, if the first frequency is 700 MHz, one or more second frequencies between 695 MHz and 705 MHz may be determined in block 640.

From decision block 640, if there were no second frequencies within the predetermined bandwidth, the process moves to block 645 where the second air interface is closed. In some embodiments, limited communication over the second air interface may occur to close the connection. In other embodiments, other actions are taken based on the determination that there were no second frequencies within the predetermined bandwidth. In one embodiment, no action is taken based on the determination that there were no second frequencies within the predetermined bandwidth and the process ends.

From decision block 640, if there were second frequencies within the predetermined bandwidth, the process continues to block 650 where at least one of the second frequencies within the predetermined bandwidth is selected. The selection can be performed by the processor 210, the modem 250, or the transceiver 270 of FIG. 2. The selection can include a single second frequency, multiple second frequencies, or even all the second frequencies within the predetermined bandwidth. Selection is inherently performed when only one second frequency is within the predetermined bandwidth. In one embodiment, one of the second frequencies is selected based on specific criteria. Preference is first given to any carrier that is in traffic, then given to a control channel carrier, then a reportable carrier, then the carrier with the highest reverse channel dropping rank. Ties can be broken randomly.

Once one or more of the second frequencies within the predetermined bandwidth have been selected, communication occurs, in block 660, over the second air interface at the selected second frequencies concurrently with communication over the first air interface. This may involve establishing a new connection or changing the frequencies of an existing connection. Communication over the second air interface may simply involve receiving information in order to perform a frequency search.

In some embodiments, the first air interface supports voice traffic and the second air interface supports data traffic. In some embodiments, the first air interface supports voice traffic only and the second air interface supports data traffic only. In some embodiments, the first air interface supports voice and data traffic and the second air interface supports only data traffic. In some of these embodiments, however, the first air interface does not support data traffic as well as the second air interface. Therefore, in some embodiments, data services associated with the first interface are suppressed when both the first and second air interfaces are established.

Figure 7:
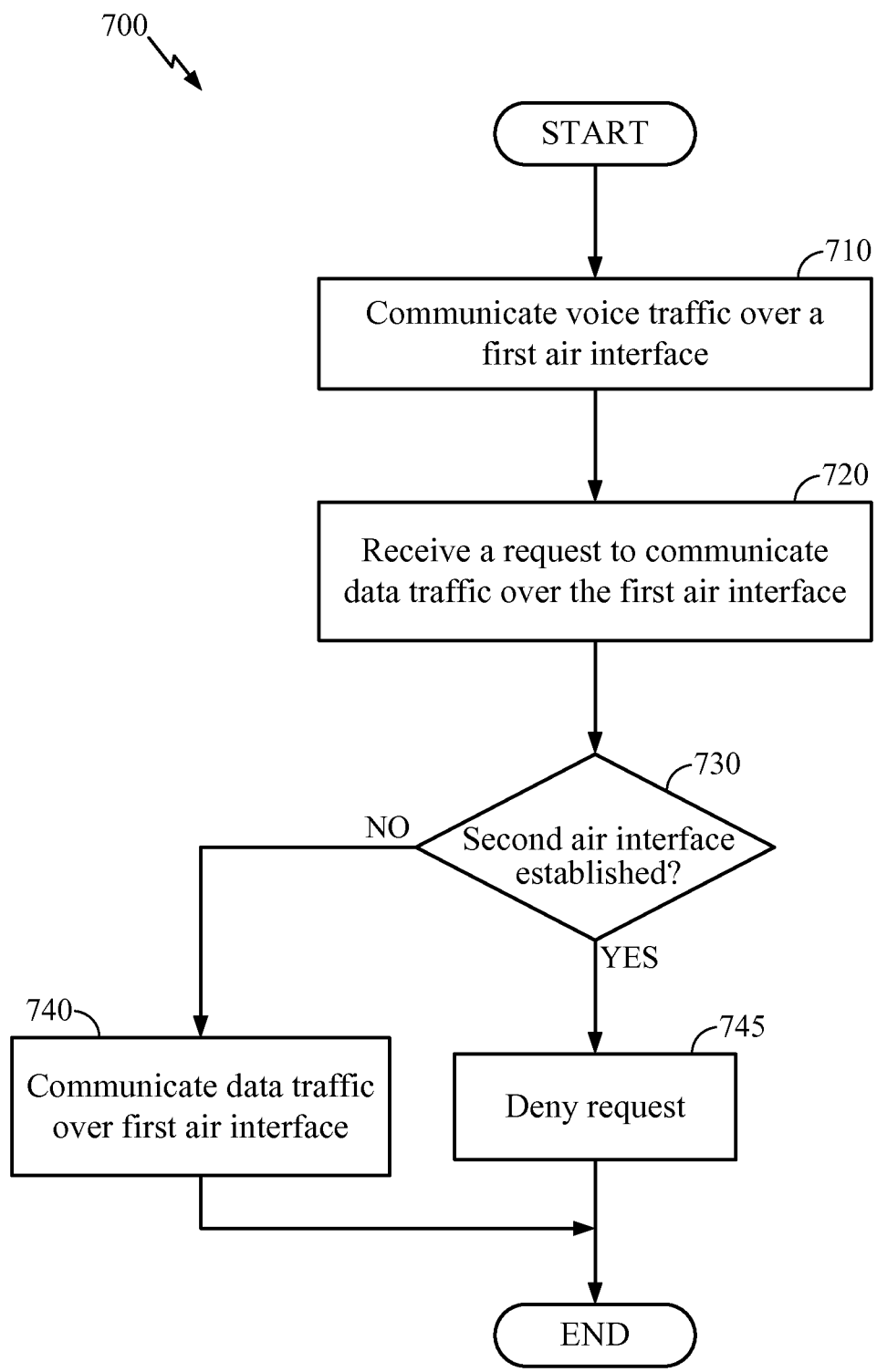
FIG. 7 is a flowchart illustrating a method of a service-based conflict between two air interfaces.

FIG. 7 is a flowchart illustrating a method of communicating over an air interface. The process 700 begins, in block 710, with the communication of voice traffic over a first air interface. The process 700 continues to block 720 with the reception of a request to communicate data traffic over the first air interface. Such a request may originate outside of, and be received by, the wireless device 10 of FIG. 2 via the antenna 270 or the input device 230. For example, the request may be a page for Service Option (SO) 33, SO4/SO12, SO5/SO13, SO7/SO15, or SO22/SO25 as standardized by 3GPP2. The request may also originate from within the wireless device 10, such as a call for SO33, SO32, SO4/SO12, SO5/SO13, SO7/SO15, or SO22/SO25.

Once the request has been received, in block 720, it is determined, in block 730, if a second air interface is established. The second air interface may be better suited for the communication of data traffic, as opposed to voice traffic. If the second air interface is established, the process 700 moves to block 745 where the request is denied. In other embodiments, the request for resources may simply go unanswered. In other embodiments, some other action is taken, such as closing a connection and/or transmitting an error message. If it is determined that a second air interface is not established, the process continues 700 to block 740 where communication of data traffic over the first interface occurs.

As described with respect to FIG. 7, if a second air interface is established, communication of data traffic over the first interface is blocked. In other embodiments, if data traffic is already being communicated over the first air interface, the establishment of a second air interface is blocked. Thus data traffic is not transmitted over both interfaces.

Figure 8:
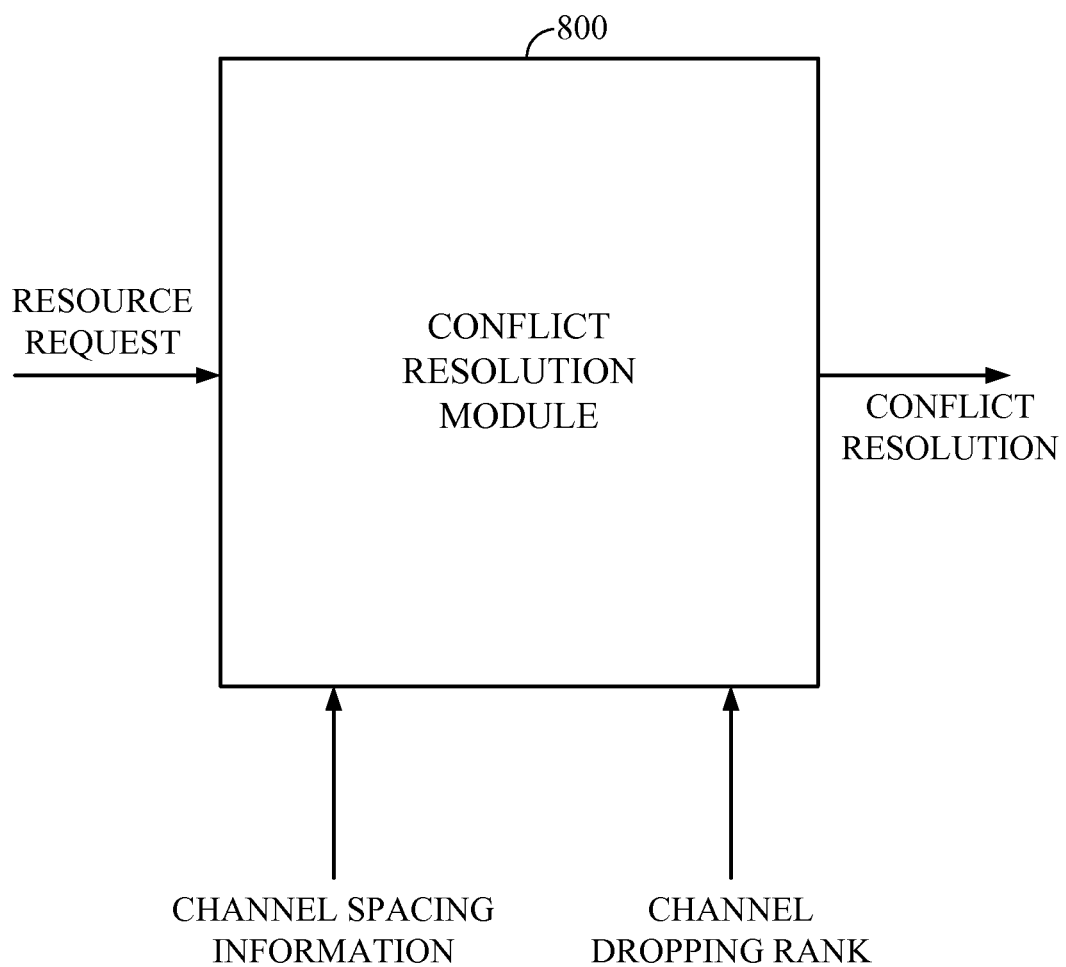
FIG. 8 is a functional block diagram of a module for resolving conflicts.

FIG. 8 is a functional block diagram of a module for resolving conflicts. Such a module can be embodied in software, firmware, hardware, or some combination thereof. The module can be configured to perform at least one of the processes 600, 700, 800 described above with respect to FIGS. 6, 7 and 8, respectively. The module 800 receives a resource request as an input, and can also receive channel spacing information and/or channel dropping rank. Channel spacing information can include the maximum supported bandwidth or other frequency information. Output from the module 800 is a conflict resolution. This resolution can include instructions to establish or close a second air interface. This resolution can also include information denying the resource request, or simply output nothing in the case that the resource request is denied.

While the specification describes particular examples of the present invention, those of ordinary skill can devise variations of the present invention without departing from the inventive concept. Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of resolving conflicts between two air interfaces, the method comprising:
    communicating over a first air interface;
    receiving a request for power resources for concurrent use in communicating over a second air interface;
    determining that a conflict does not exist between resources for the first air interface and at least a portion of the requested power resources for the second air interface; and
    concurrently communicating over the first air interface using resources for the first air interface and communicating over the second air interface using at least a portion of the requested power resources for the second air interface.

2. The method of claim 1, wherein the first air interface supports voice traffic and the second air interface supports data traffic.

3. The method of claim 1, wherein the first air interface is a voice interface and the second air interface is a data only interface.

4. The method of claim 1, further comprising receiving a request for radio frequency resources for concurrent use in communicating over the second air interface, wherein the request for radio frequency resources includes at least one of: a traffic channel assignment, instructions to hand-off, instructions to perform a frequency search, call-redirection instructions, a request to receive data traffic, or a request to transmit data traffic.

5. The method of claim 1, further comprising receiving a request for hardware resources for concurrent use in communicating over the second air interface.

6. The method of claim 5, wherein the hardware resources comprise at least one of memory space of a memory, processing power of a processor, or bandwidth of one or more buses.

7. The method of claim 1, wherein the request for power resources includes a request for battery power.

8. The method of claim 1, wherein the request for power resources includes a request for available transmit power.

9. A device comprising:
    a transceiver configured to communicate over a first air interface; and
    a processor configured to:
        receive a request for power resources for concurrent use in communicating over a second air interface; and
        determine that a conflict does not exist between resources for the first air interface and at least a portion of the requested power resources for the second air interface,
    wherein the transceiver is further configured to concurrently communicate over the first air interface using resources for the first air interface and communicate over the second air interface using at least the portion of the requested power resources for the second air interface.

10. The device of claim 9, wherein the transceiver comprises a first transceiver configured to communicate over the first air interface and a second transceiver configured to communicate over the second air interface.

11. The device of claim 9, wherein the transceiver is configured to communicate over the first air interface at a first frequency and configured to communicate over the second air interface at a second frequency within a predetermined bandwidth of the first frequency.

12. The device of claim 11, wherein the processor is configured to determine if a second frequency is within the predetermined bandwidth of the first frequency prior to communication over the second air interface.

13. The device of claim 9, wherein the processor is further configured to receive a request for radio frequency resources that includes at least one of: a traffic channel assignment, instructions to hand-off, instructions to perform a frequency search, call-redirection instructions, a request to receive data traffic, or a request to transmit data traffic.

14. The device of claim 9, wherein the processor is further configured to receive a request for hardware resources.

15. The device of claim 9, wherein the request for power resources includes a request for battery power.

16. The device of claim 9, wherein the request for power resources includes a request for available transmit power.

17. The device of claim 9, wherein the processor is further configured to:
  receive a request for radio frequency (RF) resources for concurrent use in communicating over the second air interface; and
  determine whether the requested RF resources correspond to a frequency channel outside of a supported bandwidth of the first air interface.

18. The device of claim 17, wherein the transceiver is further configured to operate in a hybrid mode in response to a determination that the requested RF resources correspond to a frequency channel outside of the supported bandwidth of the first air interface.

19. The device of claim 18, wherein, during hybrid mode operation, the transceiver selectively switches between communicating over the first air interface and communicating over the second air interface.

20. The device of claim 17, wherein the transceiver is further configured to concurrently communicate over the first air interface at a first frequency within the supported bandwidth and over the second air interface at a second frequency within the supported bandwidth in response to a determination that the requested RF resources do not correspond to a frequency channel outside of the supported bandwidth of the first air interface.

21. The device of claim 9, wherein voice traffic is communicated over the first air interface and wherein the processor is further configured to:
  receive a request to communicate data traffic over the first air interface;
  determine whether the second air interface is better suited for communication of the data traffic than the first air interface; and
  deny the request to communicate data traffic over the first air interface in response to a determination that the second air interface is better suited for communication of the data traffic.

22. A device for resolving conflicts between two air interfaces, the device comprising:
  means for communicating over a first air interface;
  means for receiving a request for power resources for concurrent use in communicating over a second air interface;
  means for determining that a conflict does not exist between resources for the first air interface and at least a portion of the requested power resources for the second air interface; and
  means for concurrently communicating over the first air interface using the resources for the first air interface and communicating over the second air interface using at least the portion of the requested power resources for the second air interface.

23. A computer chip encoded with instructions for executing a method of resolving conflicts between two air interfaces, the method comprising:
  communicating over a first air interface;
  receiving a request for power resources for concurrent use in communicating over a second air interface;
  determining that a conflict does not exist between resources for the first air interface and at least a portion of the requested power resources for the second air interface; and
  concurrently communicating over the first air interface using the resources for the first air interface and communicating over the second air interface using at least the portion of the requested power resources.

* * * * *